(12) United States Patent
Ohmori et al.

(10) Patent No.: US 11,003,043 B2
(45) Date of Patent: May 11, 2021

(54) OPTICAL MODULATOR

(71) Applicants: FUJITSU OPTICAL COMPONENTS LIMITED, Kanagawa (JP); TDK Corporation, Tokyo (JP)

(72) Inventors: Yasuhiro Ohmori, Kanagawa (JP); Masaharu Doi, Kanagawa (JP); Shintaro Takeuchi, Kanagawa (JP); Takehito Tanaka, Kanagawa (JP); Yoshinobu Kubota, Kanagawa (JP); Shinji Iwatsuka, Tokyo (JP); Kenji Endou, Tokyo (JP); Hiroki Hara, Tokyo (JP); Toshinori Matsuura, Tokyo (JP); Takashi Kikukawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/799,763

(22) Filed: Feb. 24, 2020

(65) Prior Publication Data
US 2020/0272020 A1 Aug. 27, 2020

(30) Foreign Application Priority Data
Feb. 25, 2019 (JP) .............................. JP2019-031796

(51) Int. Cl.
*G02F 1/225* (2006.01)
*G02F 1/03* (2006.01)
*G02F 1/21* (2006.01)

(52) U.S. Cl.
CPC .......... *G02F 1/2255* (2013.01); *G02F 1/0316* (2013.01); *G02F 1/212* (2021.01); *G02F 2201/063* (2013.01); *G02F 2201/07* (2013.01)

(58) Field of Classification Search
None
See application file for complete search history.

(56) References Cited

U.S. PATENT DOCUMENTS

| 10,684,530 B1 * | 6/2020 | Bian ........................ G02F 1/29 |
| 2005/0175271 A1 | 8/2005 | Sugiyama et al. |
| 2015/0138619 A1 | 5/2015 | Iwatsuka et al. |
| 2019/0146302 A1 | 5/2019 | Iwatsuka et al. |

FOREIGN PATENT DOCUMENTS

| JP | 2006-195383 A | 7/2006 |
| JP | 4485218 B2 | 6/2010 |
| JP | 2014-006348 A | 1/2014 |
| JP | 2014-142411 A | 8/2014 |
| JP | 2015-118371 A | 6/2015 |
| WO | WO2017/183484 A1 | 2/2019 |

* cited by examiner

*Primary Examiner* — Jerry Rahll
(74) *Attorney, Agent, or Firm* — McDermott Will & Emery LLP

(57) ABSTRACT

An optical modulator is provided with a ridge-shaped optical waveguide formed of a dielectric thin film having electro-optic effect, a buffer layer covering the optical waveguide, a signal electrode formed on the buffer layer so as to be opposed to the optical waveguide through the buffer layer; a ground electrode formed on the buffer layer together with the signal electrode, and a dielectric film having a higher dielectric constant than air and covering at least a part of exposed surfaces of the signal electrode and ground electrode and exposed surfaces of the buffer layer.

14 Claims, 11 Drawing Sheets

OPTICAL MODULATOR

BACKGROUND OF THE INVENTION

Field of the Invention

The present invention relates to an optical modulator used in the fields of optical communication and optical measurement and, more particularly, to a structure of a Mach-Zehnder optical modulator.

Description of Related Art

Communication traffic has been remarkably increased with widespread Internet use, and optical fiber communication is increasingly significant. The optical fiber communication is a technology that converts an electric signal into an optical signal and transmits the optical signal through an optical fiber and has a wide bandwidth, a low loss, and high resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

As the optical modulator, a Mach-Zehnder optical modulator in which an optical waveguide is formed by Ti (titanium) diffusion in the vicinity of the surface of a lithium niobate single-crystal substrate has been put to practical use (see, e.g., Japanese Patent No. 4,485,218). The Mach-Zehnder optical modulator uses an optical waveguide (Mach-Zehnder optical waveguide) having a Mach-Zehnder interferometer structure that separates light emitted from one light source into two beams, makes the two beams pass through different paths, and then recombines the two beams to cause interference. Although high-speed optical modulators having a modulation speed of 40 Gb/s or higher are commercially available, they have a major drawback that the entire length thereof is as large as about 10 cm, which is disadvantageously long.

On the other hand, JP 2006-195383A and JP 2014-006348A disclose a Mach-Zehnder optical modulator using a c-axis oriented lithium niobate film. The optical modulator using the lithium niobate film achieves significant reduction in size and driving voltage as compared with an optical modulator using the lithium niobate single-crystal substrate.

The cross-sectional structure of a conventional optical modulator 1000 described in JP 2006-195383A is illustrated in FIG. 11A. A pair of optical waveguides 22a and 22b of a lithium niobate film are formed on a sapphire substrate 21, and a signal electrode 24a and a ground electrode 24b are disposed above the optical waveguides 22a and 22b, respectively, through a buffer layer 23. The optical modulator 1000 is of a so-called single drive type having one signal electrode 24a, and the signal electrode 24a and ground electrode 24b have a symmetrical structure, so that electric fields to be applied to the optical waveguides 22a and 22b are the same in magnitude and opposite in polarity, preventing the wavelength chirp of a modulated light from occurring. However, the area of the ground electrode 24b is small, preventing operation at high frequencies.

The cross-sectional structure of a conventional optical modulator 1100 described in JP 2014-006348A is illustrated in FIG. 11B. Two signal electrodes $24a_1$ and $24a_2$ are disposed above a pair of optical waveguides 22a and 22b of a lithium niobate film, respectively, through a buffer layer 23, and three ground electrodes 24c, 24d and 24e are disposed so as to be separated from the signal electrodes $24a_1$ and $24a_2$. When voltages same in magnitude and opposite in polarity are applied to the two signal electrodes $24a_1$ and $24a_2$, respectively, electric fields to be applied to the optical waveguides 22a and 22b become the same in magnitude and opposite in polarity, preventing the wavelength chirp of a modulated light from occurring. Further, the amount of the chirp can be controlled by adjusting the voltage to be applied to the pair of optical waveguides 22a and 22b. Furthermore, a sufficient area is ensured for the left and right ground electrodes 24c and 24d, allowing operation at high frequencies. However, the optical modulator 1100, which is of a dual drive type having two signal electrodes $24a_1$ and $24a_2$, takes a complex electrode structure.

In optical modulators, a wider bandwidth of equal to or more than 35 GHz is required for higher transmission speed from 32 Gbaud currently used to 64 Gbaud. In order to achieve such a wider bandwidth, the following three points are important: (1) Reduction in electrode loss at high frequencies; (2) Velocity matching between light and microwave; and (3) Impedance matching.

However, the conventional optical modulator illustrated in FIG. 11B has a structure in which signal electrodes $24a_1$ and $24a_2$ are directly formed on a thin film buffer layer 23, so that the effective refractive index of microwave is substantially fixed by the dielectric constant of the buffer layer 23, preventing the effective refractive index of microwave from being brought close to the effective refractive index of light, which makes it difficult to achieve velocity matching between light and microwave.

Further, attenuation of microwave, effective refractive index Nm, impedance matching and drive voltage Vn have a trade-off relation, and it is required to satisfy the above respective characteristics with good balance. It is generally possible to balance among the above characteristics by adjusting parameters such as the width or height of an electrode, an electrode structure, the thickness of the buffer layer. However, it is difficult to drastically improve the respective characteristics only by adjusting the above parameters.

SUMMARY

The present invention has been made in view of the above situation, and the object thereof is to provide an optical modulator capable of bringing the effective refractive index of microwave close to the effective refractive index of light and thus to improve velocity matching.

To solve the above problems, an optical modulator according to the present invention includes: a ridge-shaped optical waveguide formed of a dielectric thin film having electro-optic effect; a buffer layer covering the optical waveguide; a signal electrode formed on the buffer layer so as to be opposed to the optical waveguide through the buffer layer; a ground electrode formed on the buffer layer together with the signal electrode; and a dielectric film having a higher dielectric constant than air and covering at least a part of exposed surfaces of the signal electrode and ground electrode and exposed surfaces of the buffer layer.

According to the present invention, a dielectric constant around the optical waveguide can be increased without being restricted by the dielectric constant of the buffer layer, thereby allowing the effective refractive index of signal wave (microwave) to be brought close to the effective refractive index of light, whereby velocity matching between light and signal wave can be improved. Further, the application portion and film thickness of the dielectric film can be freely selected, and thus, the degree of freedom of design for control of modulation band, effective refractive index Nm, impedance matching, drive voltage Vn, and the like can be increased as compared to the conventional techniques.

In the present invention, it is preferable that the dielectric film covers upper and side surfaces of the signal electrode, upper and side surfaces of the ground electrode, and an upper surface of the buffer layer in an area not overlapping the signal electrode and ground electrode in a plan view. By thus covering the entire surface of the buffer layer on which the signal electrode and ground electrode are formed, a dielectric constant around the optical waveguide can be increased, thereby allowing the effective refractive index of signal wave to be brought close to the effective refractive index of light, whereby velocity matching between light and signal wave can be improved.

In the present invention, it is preferable that the dielectric film is formed on the upper surface of the buffer layer and that the signal electrode and the ground electrode are formed on an upper surface of the dielectric film. Even with such a configuration, the effective refractive index of signal wave can be brought close to the effective refractive index of light, whereby velocity matching between light and signal wave can be improved.

In the present invention, it is preferable that the optical waveguide includes first and second waveguides constituting a Mach-Zehnder interferometer, that the signal electrode includes a first signal electrode opposed to the first waveguide through the buffer layer and a second signal electrode opposed to the second waveguide through the buffer layer, that the ground electrode includes a first ground electrode provided in the vicinity of the first signal electrode on a side opposite to the second signal electrode with respect to the first signal electrode and a second ground electrode provided in the vicinity of the second signal electrode on a side opposite to the first signal electrode with respect to the second signal electrode, that the upper surface of the buffer layer in a first inter-electrode area between the first and second signal electrodes is not covered with the dielectric film, and that the upper and both side surfaces of each of the first and second signal electrodes, the upper and side surfaces of each of the first and second ground electrodes and the upper surface of the buffer layer in a second inter-electrode area between the first signal electrode and the first ground electrode and a third inter-electrode area between the second signal electrode and the second ground electrode are covered with the dielectric film. With this configuration, it is possible to achieve not only improvement in velocity matching between light and signal wave due to approach of the effective refractive index of signal wave to the refractive index of light but also a further reduction in drive voltage Vn.

In the present invention, it is preferable that the optical waveguide includes first and second waveguides constituting a Mach-Zehnder interferometer, that the signal electrode includes a first signal electrode opposed to the first waveguide through the buffer layer and a second signal electrode opposed to the second waveguide through the buffer layer, that the ground electrode includes a first ground electrode provided in the vicinity of the first signal electrode on the side opposite to the second signal electrode with respect to the first signal electrode and a second ground electrode provided in the vicinity of the second signal electrode on the side opposite to the first signal electrode with respect to the second signal electrode, that the upper surface of the buffer layer in a first inter-electrode area between the first and second signal electrodes and the inner side surfaces of each of the first and second signal electrodes are not covered with the dielectric film, and that the upper and outer side surfaces of each of the first and second signal electrodes, the upper and side surfaces of each of the first and second ground electrodes, and the upper surface of the buffer layer in a second inter-electrode area between the first signal electrode and the first ground electrode and a third inter-electrode area between the second signal electrode and the second ground electrode are covered with the dielectric film. With this configuration, it is possible to achieve both a further reduction in drive voltage Vn and a reduction in attenuation of microwave in addition to the above-described basic effects due to the provision of the dielectric film.

In the present invention, it is preferable that the optical waveguide includes first and second waveguides constituting a Mach-Zehnder interferometer, that the signal electrode includes a first signal electrode opposed to the first waveguide through the buffer layer and a second signal electrode opposed to the second waveguide through the buffer layer, that the ground electrode includes a first ground electrode provided in the vicinity of the first signal electrode on the side opposite to the second signal electrode with respect to the first signal electrode and a second ground electrode provided in the vicinity of the second signal electrode on the side opposite to the first signal electrode with respect to the second signal electrode, that the upper surface of each of the first and second signal electrodes, the upper surface of each of the first and second ground electrodes, and the upper surface of the buffer layer in a second inter-electrode area between the first signal electrode and the first ground electrode and a third inter-electrode area between the second signal electrode and the second ground electrode are not covered with the dielectric film, and that both side surfaces of each of the first and second signal electrodes, the side surface of each of the first and second ground electrodes and the upper surface of the buffer layer in a first inter-electrode area between the first and second signal electrodes are covered with the dielectric film. With this configuration, it is possible to achieve both a further reduction in drive voltage Vn and a reduction in attenuation of microwave in addition to the above-described basic effects due to the provision of the dielectric film.

In the present invention, it is preferable that the optical waveguide includes first and second waveguides constituting a Mach-Zehnder interferometer, that the signal electrode includes a first signal electrode opposed to the first waveguide through the buffer layer and a second signal electrode opposed to the second waveguide through the buffer layer, that the ground electrode includes a first ground electrode provided in the vicinity of the first signal electrode on the side opposite to the second signal electrode with respect to the first signal electrode and a second ground electrode provided in the vicinity of the second signal electrode on the side opposite to the first signal electrode with respect to the second signal electrode, that the upper and both side surfaces of each of the first and second signal electrodes and the upper and side surfaces of each of the first and second ground electrodes are not covered with the dielectric film, and that the upper surface of the buffer layer in a first inter-electrode area between the first and second signal electrodes, a second inter-electrode area between the first signal electrode and the first ground electrode and a third inter-electrode area between the second signal electrode and the second ground electrode is covered with the dielectric film. With this configuration, it is possible to achieve a further reduction in attenuation of microwave.

In the present invention, it is preferable that the optical waveguide includes first and second waveguides constituting a Mach-Zehnder interferometer, that the signal electrode includes a first signal electrode opposed to the first waveguide through the buffer layer and a second signal electrode opposed to the second waveguide through the buffer layer, that the ground electrode includes a first ground electrode provided in the vicinity of the first signal electrode on the side opposite to the second signal electrode with respect to the first signal electrode and a second ground electrode provided in the vicinity of the second signal electrode on the side opposite to the first signal electrode with respect to the second signal electrode, that the upper and both side surfaces of each of the first and second signal electrodes, the upper and side surfaces of each of the first and second ground electrodes, and the upper surface of the buffer layer in a second inter-electrode area between the first signal electrode and the first ground electrode and a third inter-electrode area between the second signal electrode and the second ground electrode are not covered with the dielectric film, and that the upper surface of the buffer layer in a first inter-electrode area between the first and second signal electrodes is covered with the dielectric film. With this configuration, it is possible to achieve a further reduction in attenuation of microwave.

In the present invention, it is preferable that at least a part of the dielectric film in an inter-electrode area between the signal electrode and the ground electrode is removed together with the buffer layer. With his configuration, a suppression effect of a so-called DC drift can be enhanced.

In the present invention, it is preferable that the dielectric constant of the dielectric film is higher than the dielectric constant of the buffer layer. Thus, the effective refractive index of signal wave can be increased, whereby velocity matching between light and signal wave can be improved.

According to the present invention, there can be provided an optical modulator capable of bringing the effective refractive index of microwave close to the effective refractive index of light and thus to improve velocity matching.

BRIEF DESCRIPTION OF THE DRAWINGS

The above and other objects, features and advantages of this invention will become more apparent by reference to the following detailed description of the invention taken in conjunction with the accompanying drawings, wherein:

FIGS. 1A and 1B are schematic plan views illustrating the configuration of an optical modulator according to a first embodiment of the present invention, in which FIG. 1A illustrates only an optical waveguide, and FIG. 1B illustrates the entire configuration of the optical modulator including traveling-wave electrodes;

FIGS. 10A and 10B are schematic plan views illustrating the configuration of an optical modulator according to a ninth embodiment of the present invention, in which FIG. 10A illustrates only an optical waveguide, and FIG. 10B illustrates the entire configuration of the optical modulator including traveling-wave electrodes.

DETAILED DESCRIPTION OF THE EMBODIMENTS

Preferred embodiments of the present invention will now be explained in detail with reference to the drawings.

Figure 1A:
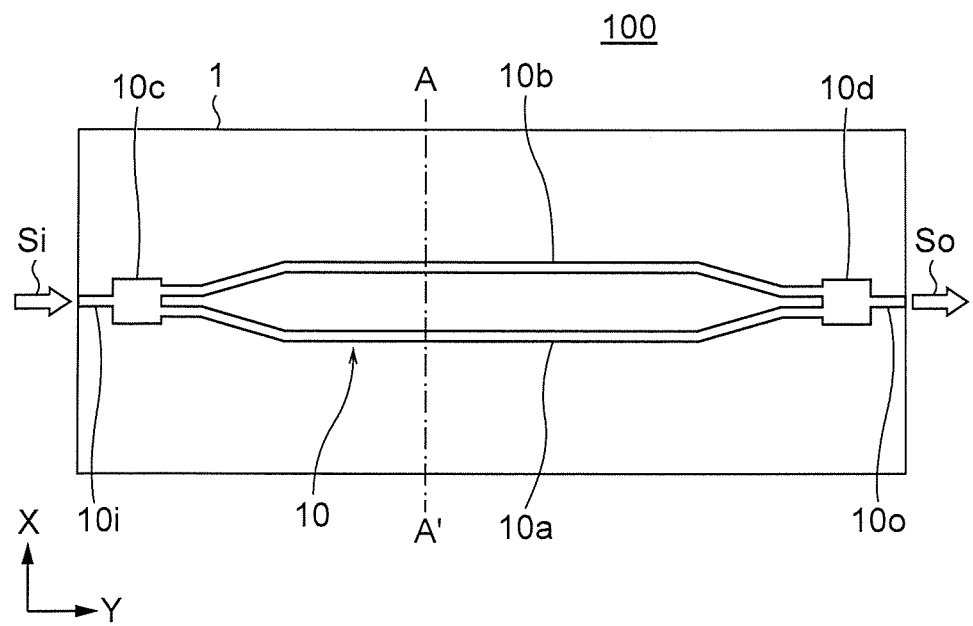
Figure 1B:
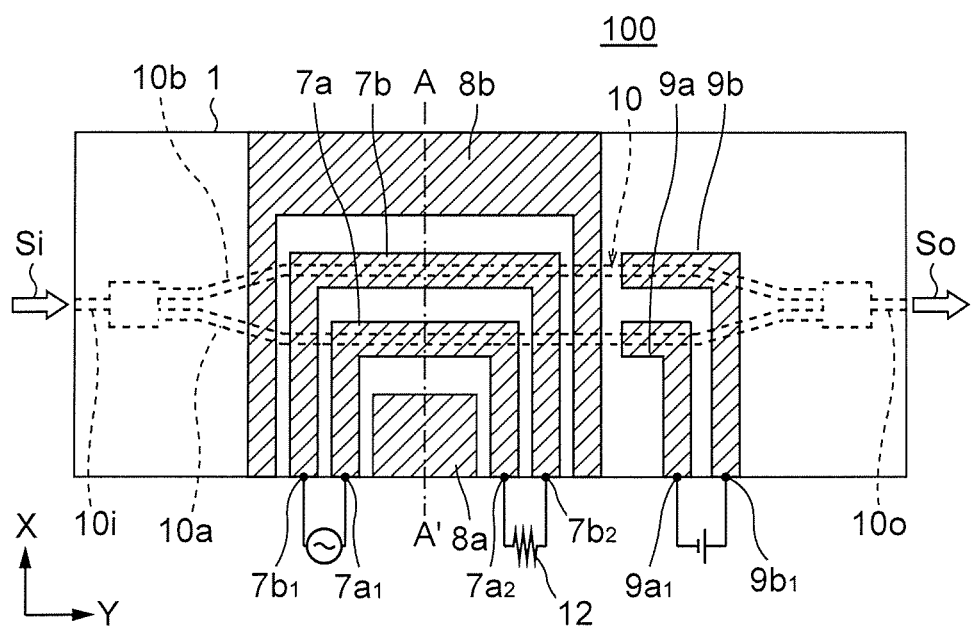

FIGS. 1A and 1B are schematic plan views illustrating the configuration of an optical modulator according to a first embodiment of the present invention. FIG. 1A illustrates only an optical waveguide, and FIG. 1B illustrates the entire configuration of the optical modulator including traveling-wave electrodes.

As illustrated in FIGS. 1A and 1B, an optical modulator 100 is constituted by a single Mach-Zehnder optical modulating element and includes a Mach-Zehnder optical waveguide 10 formed on a substrate 1 and having first and second optical waveguides 10a and 10b provided in parallel to each other, a first signal electrode 7a provided along the first optical waveguide 10a, a second signal electrode 7b provided along the second optical waveguide 10b, first and second ground electrodes 8a and 8b provided sandwiching the first and second signal electrodes 7a and 7b therebetween, a first bias electrode 9a provided along the first optical waveguide 10a, and a second bias electrode 9b provided along the second optical waveguide 10b.

The Mach-Zehnder optical waveguide 10 is an optical waveguide having a Mach-Zehnder interferometer structure. The first and second optical waveguides 10a and 10b branched from a single input waveguide 10i at a demultiplexer 10c are combined into a single output waveguide 10o at a multiplexer 10d. An input light Si is demultiplexed at the demultiplexer 10c. The demultiplexed lights travel through the first and second optical waveguides 10a and 10b and then multiplexed at the multiplexer 10d. The multiplexed light is then output from the output waveguide 10o as a modulated light So.

The first and second signal electrodes 7a and 7b are linear electrodes overlapping the first and second optical waveguides 10a and 10b, respectively, in a plan view and are positioned between the first and second ground electrodes 8a and 8b. Both ends of each of the first and second signal electrodes 7a and 7b are drawn to the outer peripheral end of the substrate 1. One ends $7a_1$ and $7b_1$ of the first and second signal electrodes 7a and 7b each serve as a signal input terminal, and the other ends $7a_2$ and $7b_2$ thereof are connected to each other through a terminal resistor 12.

Alternatively, the other end $7a_2$ of the first signal electrode 7a may be connected to the first ground electrode 8a through a first terminal resistor, and the other end $7b_2$ of the second signal electrode 7b may be connected to the second ground electrode 8b through a second terminal resistor. As a result, the first and second signal electrodes 7a and 7b function as differential coplanar traveling-wave electrodes together with the first and second ground electrodes 8a and 8b.

The first and second bias electrodes 9a and 9b are provided independently of the first and second signal electrodes 7a and 7b, respectively, so as to apply direct-current voltage (DC bias) to the first and second optical waveguides 10a and 10b. One ends $9a_1$ and $9b_1$ of the first and second bias electrodes 9a and 9b are each an input terminal of the DC bias. In the present embodiment, the formation area of the first and second bias electrodes 9a and 9b is positioned closer to the output terminal side of the Mach-Zehnder optical waveguide 10 than the formation area of the first and second signal electrodes 7a and 7b are, although it may be positioned closer to the input terminal side. Further, the first and second bias electrodes 9a and 9b may be omitted, and instead, a modulated signal including superimposed DC bias may be input to the first and second signal electrodes 7a and 7b.

Differential signals (modulated signals) having the same absolute value but opposite signs are input to the one end $7a_1$ of the first signal electrode 7a and one end $7b_1$ of the second signal electrode 7b. The first and second optical waveguides 10a and 10b are formed of a material, such as lithium niobate having electro-optic effect, so that the refractive indices of the first and second optical waveguides 10a and 10b are changed with $+\Delta n$ and $-\Delta n$ by an electric field applied to the first and second optical waveguides 10a and 10b, with the result that a phase difference between the pair of optical waveguides changes. A signal light modulated by the change in the phase difference is output from the output waveguide 100.

As described above, the optical modulator 100 according to the present embodiment is of a dual drive type constituted by the pair of signal electrodes 7a and 7b, so that it is possible to increase the symmetry of the electric field to be applied to the pair of optical waveguides to thereby reduce the wavelength chirp.

Figure 2:
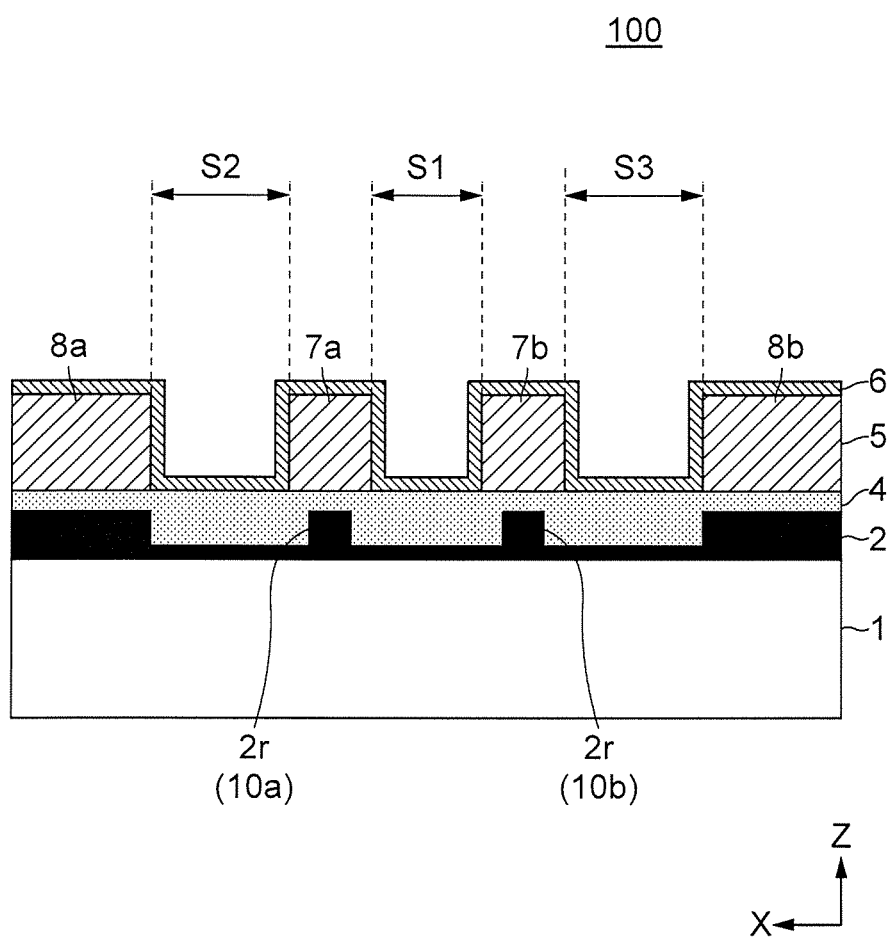
FIG. 2 is a schematic cross-sectional view illustrating the configuration of the optical modulator according to the first embodiment of the present invention.

FIG. 2 is a schematic cross-sectional view illustrating the configuration of the optical modulator according to the first embodiment of the present invention.

As illustrated in FIG. 2, the optical modulator 100 according to the present embodiment has a multilayer structure including a substrate 1, a waveguide layer 2, a buffer layer 4, an electrode layer 5 and a dielectric layer (dielectric film) 6 which are laminated in this order.

The substrate 1 is, e.g., a sapphire substrate, and the waveguide layer 2 formed of an electro-optic material, such as a lithium niobate film, is formed on the surface of the substrate 1. The waveguide layer 2 has the first and second optical waveguides 10a and 10b each formed by a ridge part 2r. The ridge width of each of the first and second optical waveguides 10a and 10b can be set to, e.g., 1 μm.

The buffer layer 4 is formed on the upper surfaces of the ridge parts 2r so as to prevent light propagating through the first and second optical waveguides 10a and 10b from being absorbed by the first and second signal electrodes 7a and 7b. The buffer layer 4 is preferably formed of a material having a lower refractive index than the waveguide layer 2 and a high transparency, such as $Al_2O_3$, $SiO_2$, $LaAlO_3$, $LaYO_3$, ZnO, $HfO_2$, MgO or $Y_2O_3$, and the thickness thereof on the upper surface of the ridge part 2r may be about 0.2 μm to 1 μm. In the present embodiment, although the buffer layer 4 covers not only the upper surfaces of the respective first and second optical waveguides 10a and 10b, but also the entire underlying surface including the upper surface of a slab part, it may be patterned so as to selectively cover only the vicinity of the upper surfaces of the first and second optical waveguides 10a and 10b.

The film thickness of the buffer layer 4 is preferably as large as possible in order to reduce light absorption of an electrode and preferably as small as possible in order to apply a high electric field to the first and second optical waveguides 10a and 10b. The light absorption and applied voltage of an electrode have a trade-off relation, so that it is necessary to set an adequate film thickness according to the purpose. The dielectric constant of the buffer layer 4 is preferably as high as possible, because the higher the dielectric constant thereof, the more VπL (index representing electric field efficiency) is reduced. Further, the refractive index of the buffer layer 4 is preferably as low as possible, because the lower the refractive index thereof, the thinner the buffer layer 4 can be. In general, a material having a high dielectric constant has a higher refractive index, so that it is important to select a material having a high dielectric constant and a comparatively low refractive index considering the balance therebetween. For example, $Al_2O_3$ has a specific dielectric constant of about 9 and a refractive index of about 1.6 and is thus preferable. $LaAlO_3$ has a specific dielectric constant of about 13 and a refractive index of about 1.7, and $LaYO_3$ has a specific dielectric constant of about 17 and a refractive index of about 1.7, and they are thus particularly preferable.

The electrode layer 5 is provided with the first and signal electrodes 7a and 7b. The first signal electrode 7a is provided overlapping the ridge part 2r corresponding to the first optical waveguide 10a so as to modulate light traveling inside the first optical waveguide 10a and is opposed to the first optical waveguide 10a through the buffer layer 4. The second signal electrode 7b is provided overlapping the ridge part 2r corresponding to the second optical waveguide 10b so as to modulate light traveling inside the second optical waveguide 10b and is opposed to the second optical waveguide 10b through the buffer layer 4.

The electrode layer 5 is provided with the first and second ground electrodes 8a and 8b. The first ground electrode 8a is provided in the vicinity of the first signal electrode 7a on the side opposite to the second signal electrode 7b with respect to the first signal electrode 7a and, the second ground electrode 8b is provided in the vicinity of the second signal electrode 7b on the side opposite to the first signal electrode 7a with respect to the second signal electrode 7b. That is, the first and second ground electrodes 8a and 8b are provided outside the pair of signal electrodes 7a and 7b so as to sandwich them.

The dielectric film 6 is formed of a material having a higher dielectric constant than at least air and is provided so as to cover the entire underlying surface on which the electrode layer 5 is formed. The dielectric constant of the dielectric film 6 is preferably higher than that of the buffer layer 4. The thickness of the dielectric film 6 is not particularly limited, but is preferably about 0.1 μm to 5 μm.

The dielectric film 6 covers the upper and side surfaces of each of the first and second signal electrodes 7a and 7b, the upper and side surfaces of each of the first and second ground electrodes 8a and 8b, and the upper surface of the buffer layer 4 that does not overlap the first and second signal electrodes 7a and 7b and the first and second ground electrodes 8a and 8b in a plan view. The upper surface of the buffer layer 4 is not exposed in a first inter-electrode area S1 between the first and second signal electrodes 7a and 7b, a second inter-electrode area S2 between the first signal electrode 7a and the first ground electrode 8a, and a third inter-electrode area S3 between the second signal electrode 7b and the second ground electrode 8b.

The dielectric constant and film thickness of the buffer layer 4 covering the waveguide layer 2 are substantially fixed as described above since they have influence on optical loss and VπL. However, in the structure of the optical modulator 100 according to the present embodiment, the dielectric constant of the dielectric film 6 can be freely set, allowing the effective refractive index of signal wave to be brought close to the effective refractive index of light by selection of a high dielectric constant film material. Further, the application portion and film thickness of the dielectric film 6 can be freely selected, and thus, the degree of freedom of design for control of modulation band, effective refractive index Nm, impedance matching, drive voltage Vn and the like can be increased as compared to the conventional techniques.

Although the waveguide layer 2 is not particularly limited in type so long as it is formed of an electro-optic material, it is preferably formed of lithium niobate ($LiNbO_3$). This is because lithium niobate has a large electro-optic constant and is thus suitable as the constituent material of an optical device such as an optical modulator. Hereinafter, the configuration of the present embodiment when the waveguide layer 2 is formed using a lithium niobate film will be described in detail.

Although the substrate 1 is not particularly limited in type as long as it has a lower refractive index than the lithium niobate film, it is preferably a substrate on which the lithium niobate film can be formed as an epitaxial film. Specifically, the substrate 1 is preferably a sapphire single-crystal substrate or a silicon single-crystal substrate. The crystal orientation of the single-crystal substrate is not particularly limited. The lithium niobate film can be easily formed as a c-axis oriented epitaxial film on single-crystal substrates having different crystal orientations. Since the c-axis oriented lithium niobate film has three-fold symmetry, the underlying single-crystal substrate preferably has the same symmetry. Thus, the single-crystal sapphire substrate preferably has a c-plane, and the single-crystal silicon substrate preferably has a (111) surface. The "epitaxial film" refers to a film having the crystal orientation of the underlying substrate or film. Assuming that the film surface extends in X-Y plane and that the film thickness direction is Z-axis direction, the crystal of the epitaxial film is uniformly oriented along the X-axis and Y-axis on the film surface and along the Z-axis in the thickness direction. For example, the epitaxial film can be confirmed by first measuring the peak intensity at the orientation position by 2θ-θ X-ray diffraction and secondly observing poles.

Specifically, first, in the 2θ-θ X-ray diffraction measurement, all the peak intensities except for the peak intensity on a target surface must be equal to or less than 10%, preferably equal to or less than 5%, of the maximum peak intensity on the target surface. For example, in a c-axis oriented epitaxial lithium niobate film, the peak intensities except for the peak intensity on a (00L) surface are equal to or less than 10%, preferably equal to or less than 5%, of the maximum peak intensity on the (00L) surface. (00L) is a general term for (001), (002) and other equivalent surfaces.

Secondly, poles must be observable in the measurement. Under the condition where the peak intensities are measured at the first orientation position, only the orientation in a single direction is proved. Even if the first condition is satisfied, in the case of nonuniformity in the in-plane crystalline orientation, the X-ray intensity does not increase at a particular angle, and poles cannot be observed. Since $LiNbO_3$ has a trigonal crystal system structure, single-crystal $LiNbO_3$ (014) has 3 poles. For the lithium niobate film, it is known that crystals rotated by 180° about the c-axis are epitaxially grown in a symmetrically coupled twin crystal state. In this case, three poles are symmetrically coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNb_AA_yO_z$. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film preferably has a film thickness of equal to or smaller than 2 μm. This is because a high-quality lithium niobate film having a thickness larger than 2 μm is difficult to form. The lithium niobate film having an excessively small thickness cannot completely confine light in it, allowing the light to penetrate through the substrate 1 and/or the buffer layer 4. Application of an electric field to the lithium niobate film may therefore cause a small change in the effective refractive index of the optical waveguides (10a and 10b). Thus, the lithium niobate film preferably has a film thickness that is at least approximately one-tenth of the wavelength of light to be used.

The lithium niobate film is preferably formed using a film formation method, such as sputtering, CVD or sol-gel process. Application of an electric field in parallel to the c-axis of the lithium niobate that is oriented perpendicular to the main surface of the substrate 1 can change the optical refractive index in proportion to the electric field. In the case of the single-crystal substrate made of sapphire, the lithium niobate film can be directly epitaxially grown on the sapphire single-crystal substrate. In the case of the single-crystal substrate made of silicon, the lithium niobate film is epitaxially grown on a clad layer (not illustrated). The clad layer (not illustrated) has a refractive index lower than that of the lithium niobate film and should be suitable for epitaxial growth. For example, a high-quality lithium niobate film can be formed on a clad layer (not illustrated) made of $Y_2O_3$.

As a formation method for the lithium niobate film, there is known a method of thinly polishing or slicing the lithium niobate single crystal substrate. This method has an advantage that characteristics same as those of the single crystal can be obtained and can be applied to the present invention.

As described above, in the optical modulator 100 according to the present embodiment, the entire upper surface of the electrode layer 5 including the upper surface of the buffer layer 4 exposed in the inter-electrode areas S1, S2 and S3 is covered with the dielectric film 6, so that the effective refractive index of microwave can be brought close to the effective refractive index of light, whereby velocity matching between signal wave and light can be improved.

Figure 3:
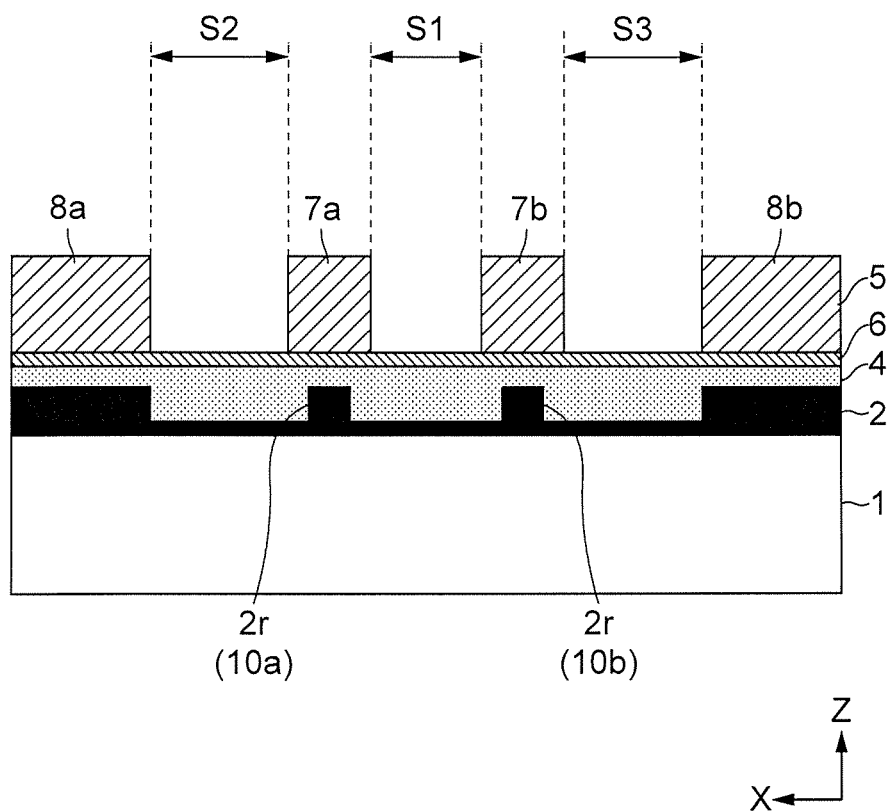
FIG. 3 is a schematic cross-sectional view illustrating the configuration of an optical modulator according to a second embodiment of the present invention.

FIG. 3 is a schematic cross-sectional view illustrating the configuration of an optical modulator according to a second embodiment of the present invention.

As illustrated in FIG. 3, an optical modulator 200 according to the present embodiment is featured in that the dielectric film 6 is provided between the buffer layer 4 and the electrode layer 5. Specifically, the dielectric film 6 is formed on the upper surface of the buffer layer 4, and the first and second signal electrodes 7a, 7b and first and second ground electrodes 8a, 8b are formed on the upper surface of the dielectric film 6. The dielectric film 6 covers the entire upper surface of the buffer layer 4 and is thus formed not only in an area not overlapping the first and second signal electrodes 7a, 7b and first and second ground electrodes 8a, 8b in a plan view but also in an area overlapping the first and second signal electrodes 7a, 7b and first and second ground electrodes 8a, 8b in a plan view. On the other hand, the upper and both side surfaces of each of the first and second signal electrodes 7a and 7b and the upper and side surfaces of the first and second ground electrodes 8a and 8b are not covered with the dielectric film 6 but exposed. Other configurations are the same as those of the first embodiment.

As described above, in the optical modulator 200 according to the present embodiment, the dielectric film 6 having a higher dielectric constant than air is provided on the upper surface of the buffer layer 4, so that the effective refractive index of microwave can be increased as in the first embodiment to allow improvement in velocity matching between signal wave and light.

Figure 4:
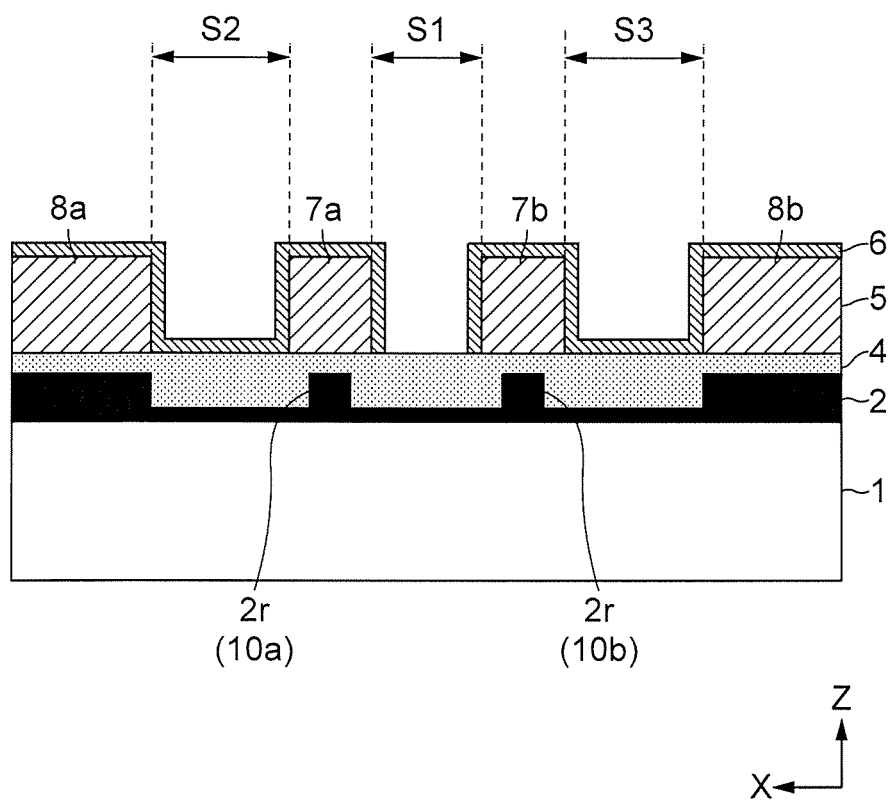
FIG. 4 is a schematic cross-sectional view illustrating the configuration of an optical modulator according to a third embodiment of the present invention.

FIG. 4 is a schematic cross-sectional view illustrating the configuration of an optical modulator according to a third embodiment of the present invention.

As illustrated in FIG. 4, an optical modulator 300 according to the present embodiment is featured in that the upper and both side surfaces of each of the first and second signal electrodes 7a and 7b, the upper and side surfaces of each of the first and second ground electrodes 8a and 8b, and the upper surface of the buffer layer 4 in the inter-electrode area S2 between the first signal electrode 7a and the first ground electrode 8a and the inter-electrode area S3 between the second signal electrode 7b and the second ground electrode 8b are covered with the dielectric film 6, while the upper surface of the buffer layer 4 in the inter-electrode area S1 between the first and second signal electrodes 7a and 7b is not covered with the dielectric film 6 but exposed. That is, the entire exposed surface excluding the inter-electrode area S1 between the first and second signal electrodes 7a and 7b is covered with the dielectric film 6. Other configurations are the same as those of the first embodiment.

As described above, in the optical modulator 300 according to the present embodiment, as compared to the first embodiment, the dielectric film 6 in the inter-electrode area S1 between the first and second signal electrodes 7a and 7b is removed, so that the drive voltage Vn can be reduced more than in the first embodiment of the present invention.

Figure 5:
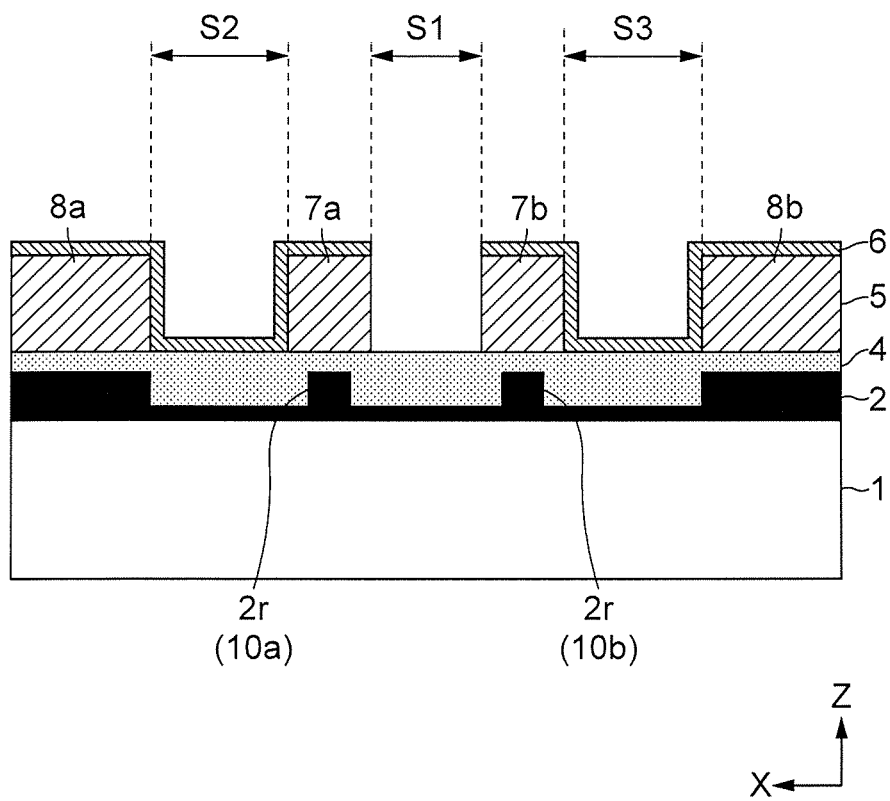
FIG. 5 is a schematic cross-sectional view illustrating the configuration of an optical modulator according to a fourth embodiment of the present invention.

FIG. 5 is a schematic cross-sectional view illustrating the configuration of an optical modulator according to a fourth embodiment of the present invention.

As illustrated in FIG. 5, an optical modulator 400 according to the present embodiment is featured in that the upper and outer side surfaces of each of the first and second signal electrodes 7a and 7b, the upper and side surfaces of each of the first and second ground electrodes 8a and 8b, and the upper surface of the buffer layer 4 in the inter-electrode area S2 between the first signal electrode 7a and the first ground electrode 8a and the inter-electrode area S3 between the second signal electrode 7b and the second ground electrode 8b are covered with the dielectric film 6, while the upper surface of the buffer layer 4 in the inter-electrode area S1 between the first and second signal electrodes 7a and 7b, the inner side surface of the first signal electrode 7a opposed to the second signal electrode 7b, and the inner side surface of the second signal electrode 7b opposed to the first signal electrode 7a are not covered with the dielectric film 6 but exposed. That is, the entire exposed surface excluding the inner side surface of each of the first and second signal electrodes 7a and 7b and the inter-electrode area S1 between the first and second signal electrodes 7a and 7b is covered with the dielectric film 6. Other configurations are the same as those of the first embodiment.

As described above, in the optical modulator 400 according to the present embodiment, as compared to the third embodiment, the dielectric film 6 covering the inner side surface of each of the first and second signal electrodes 7a and 7b is further removed, so that a further reduction in drive voltage Vn and a reduction in attenuation of microwave can be achieved.

Figure 6:
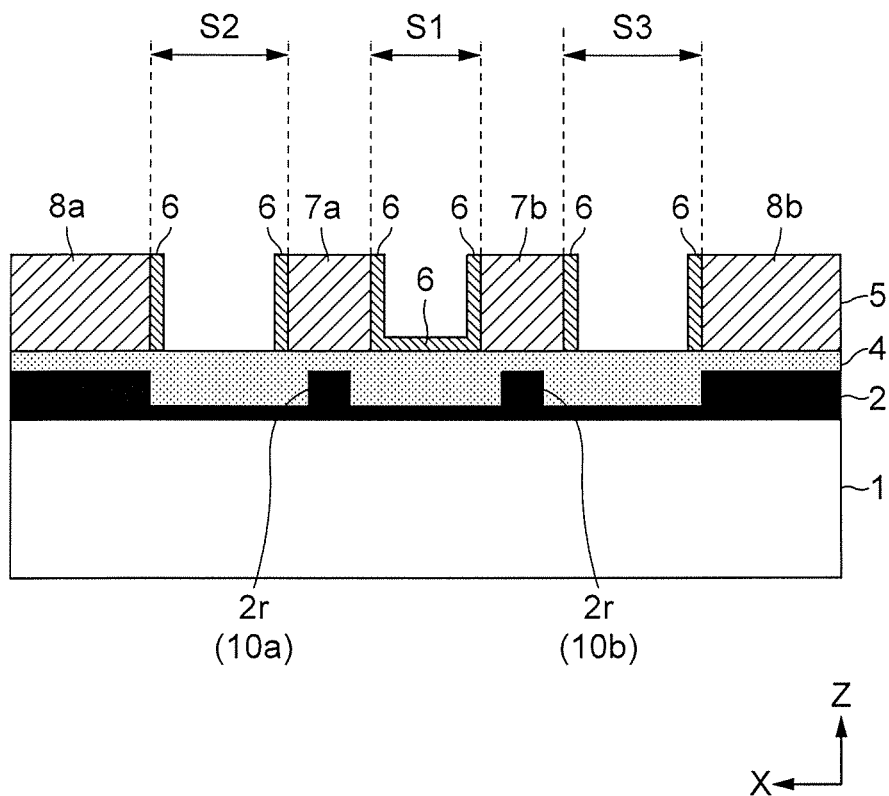
FIG. 6 is a schematic cross-sectional view illustrating the configuration of an optical modulator according to a fifth embodiment of the present invention.

FIG. 6 is a schematic cross-sectional view illustrating the configuration of an optical modulator according to a fifth embodiment of the present invention.

As illustrated in FIG. 6, an optical modulator 500 according to the present embodiment is featured in that the both side surfaces of each of the first and second signal electrodes 7a and 7b, the side surfaces of each of the first and second ground electrodes 8a and 8b and the upper surface of the buffer layer 4 in the inter-electrode area S1 between the first and second signal electrodes 7a and 7b are covered with the dielectric film 6, while the upper surface of each of the first and second signal electrodes 7a and 7b and the upper surface of the buffer layer 4 in the inter-electrode area S2 between the first signal electrode 7a and the first ground electrode 8a and the inter-electrode area S3 between the second signal electrode 7b and the second ground electrode 8b are not covered with the dielectric film 6 but exposed. Even with this configuration, a further reduction in drive voltage Vn and a reduction in attenuation of microwave can be achieved as in the fifth embodiment.

Figure 7:
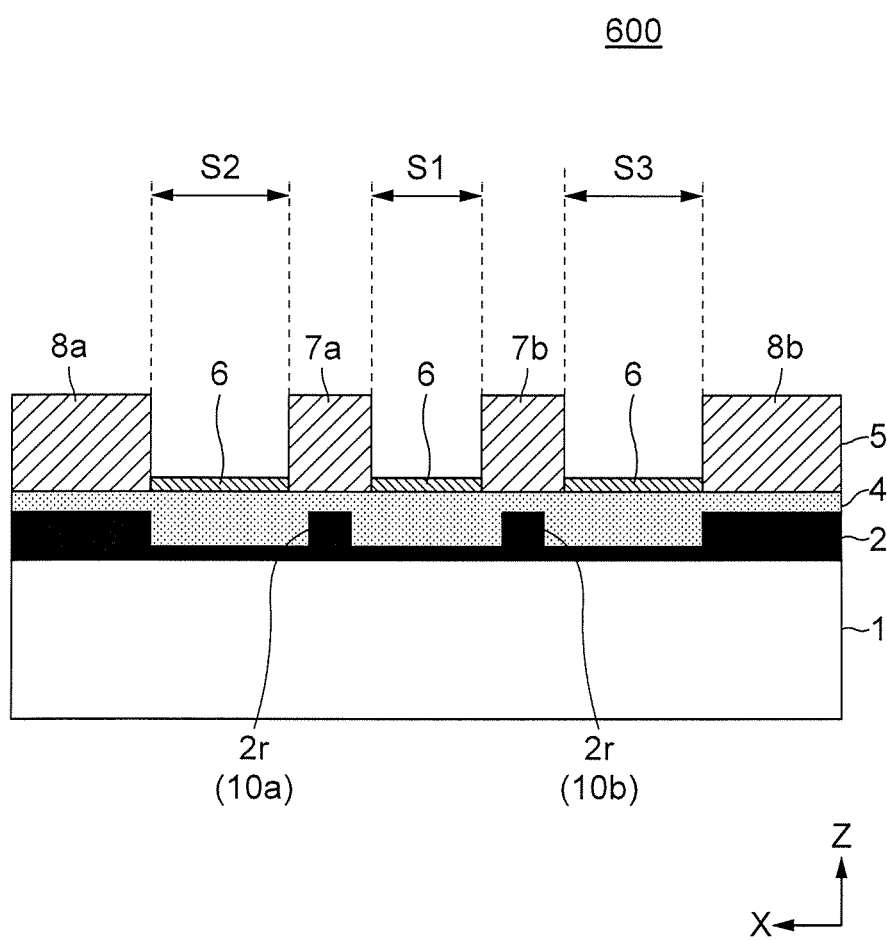
FIG. 7 is a schematic cross-sectional view illustrating the configuration of an optical modulator according to a sixth embodiment of the present invention.

FIG. 7 is a schematic cross-sectional view illustrating the configuration of an optical modulator according to a sixth embodiment of the present invention.

As illustrated in FIG. 7, an optical modulator 600 according to the present embodiment is featured in that the upper surface of the buffer layer 4 in the inter-electrode area S1 between the first and second signal electrodes 7a and 7b, the inter-electrode area S2 between the first signal electrode 7a and the first ground electrode 8a and the inter-electrode area S3 between the second signal electrode 7b and the second ground electrode 8b is covered with the dielectric film 6, while the upper and side surfaces of each of the first and second signal electrodes 7a and 7b and the upper and side surfaces of each of the first and second ground electrodes 8a and 8b are not covered with the dielectric film 6 but exposed. That is, only the inter-electrode areas S1, S2 and S3 are covered with the dielectric film 6. Other configurations are the same as those of the first embodiment.

As described above, in the optical modulator 600 according to the present embodiment, only the upper surface of the buffer layer 4 in the inter-electrode areas S1, S2 and S3 is covered with the dielectric film 6, a further reduction in attenuation of microwave can be achieved as compared to the fifth embodiment.

Figure 8:
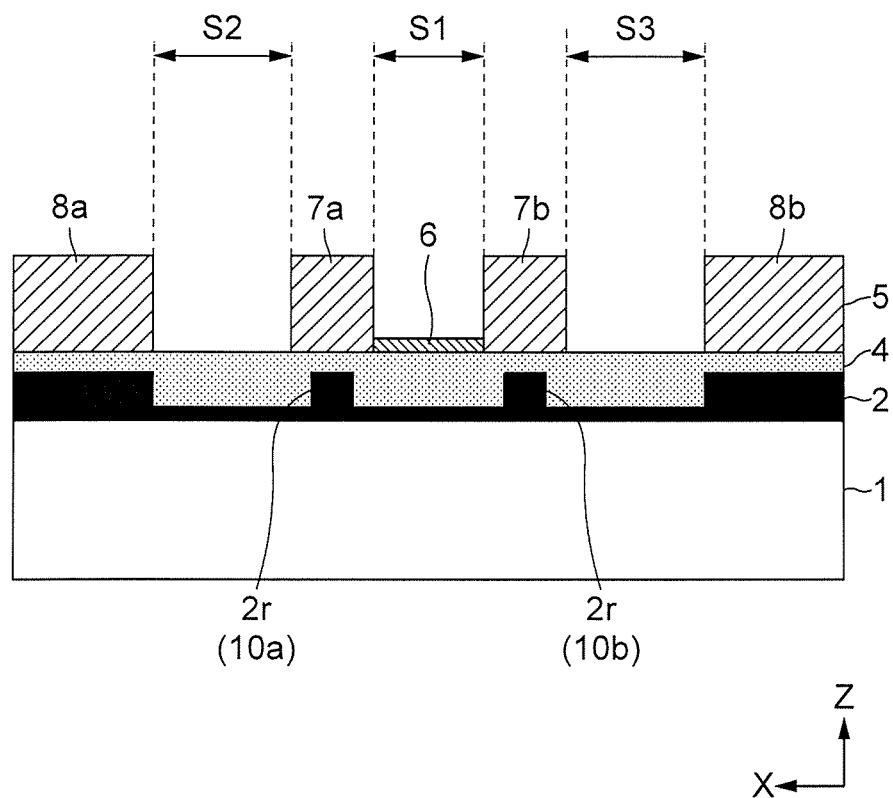
FIG. 8 is a schematic cross-sectional view illustrating the configuration of an optical modulator according to a seventh embodiment of the present invention.

FIG. 8 is a schematic cross-sectional view illustrating the configuration of an optical modulator according to a seventh embodiment of the present invention.

As illustrated in FIG. 8, an optical modulator 700 according to the present embodiment is featured in that the upper surface of the buffer layer 4 in the inter-electrode area S1 between the first and second signal electrodes 7a and 7b is covered with the dielectric film 6, while other portions are not covered with the dielectric film 6 but exposed. That is, only the inter-electrode area S1 is covered with the dielectric film 6. Other configurations are the same as those of the first embodiment. As described above, in the optical modulator 700 according to the present embodiment, only the upper surface of the buffer layer 4 in the inter-electrode area S1 is covered with the dielectric film 6, a further reduction in attenuation of microwave can be achieved as compared to the sixth embodiment of the present invention.

Figure 9A:
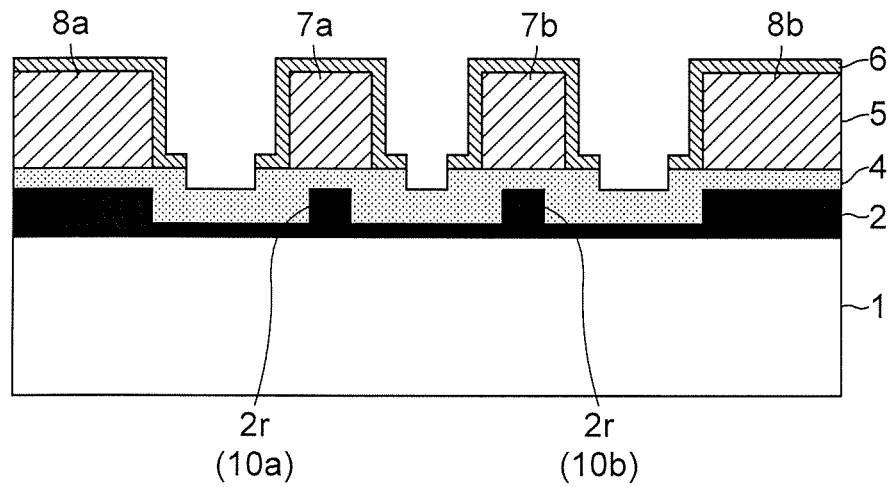
FIGS. 9A and 9B are schematic cross-sectional views illustrating the configuration of an optical modulator according to an eighth embodiment of the present invention.
Figure 9B:
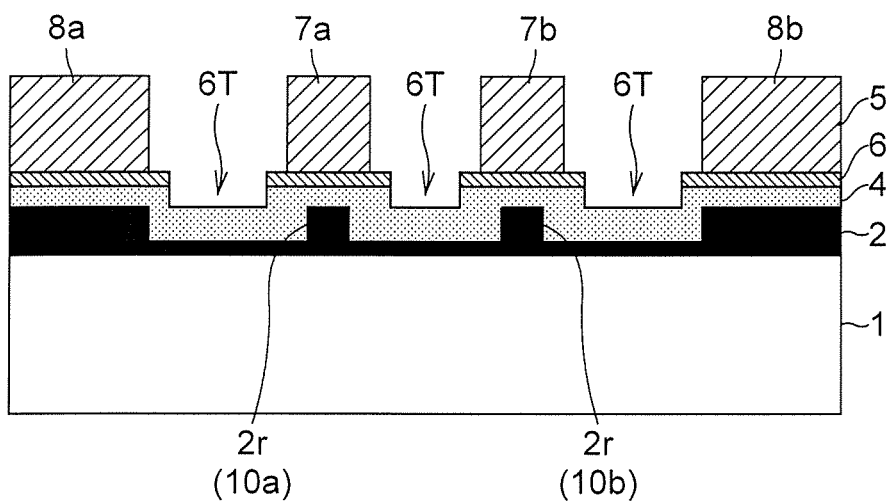

FIGS. 9A and 9B are schematic cross-sectional views illustrating the configuration of an optical modulator according to an eighth embodiment of the present invention.

As illustrated in FIGS. 9A and 9B, optical modulators 800A and 800B according to the present embodiment are featured in that the inter-electrode areas S1, S2 and S3 (areas between the first and second signal electrodes 7a and 7b, between the first signal electrode 7a and the first ground electrode 8a, and between the second signal electrode 7b and the second ground electrode 8b) are dug to remove at least a part of the dielectric film 6 together with the buffer layer 4. In particular, the structure of the optical modulator 800A illustrated in FIG. 9A is obtained by removing the dielectric film 6 and buffer layer 4 in the inter-electrode areas S1 to S3 in the structure of the optical modulator 100 illustrated in FIG. 2. The structure of the optical modulator 800B illustrated in FIG. 9B is obtained by removing the dielectric film 6 and buffer layer 4 in the inter-electrode areas S1 to S3 in the structure of the optical modulator 200 illustrated in FIG. 3. Although not illustrated, it is possible to apply the present embodiment to the structures illustrated in FIGS. 4 to 8.

The dielectric film 6 in the inter-electrode areas S1 to S3 is one of the factors that could cause a DC drift; however, when the dielectric film 6 in the inter-electrode areas S1 to S3 is removed together with the buffer layer 4 as in the present embodiment, a suppression effect of the DC drift can be enhanced.

Figure 10A:
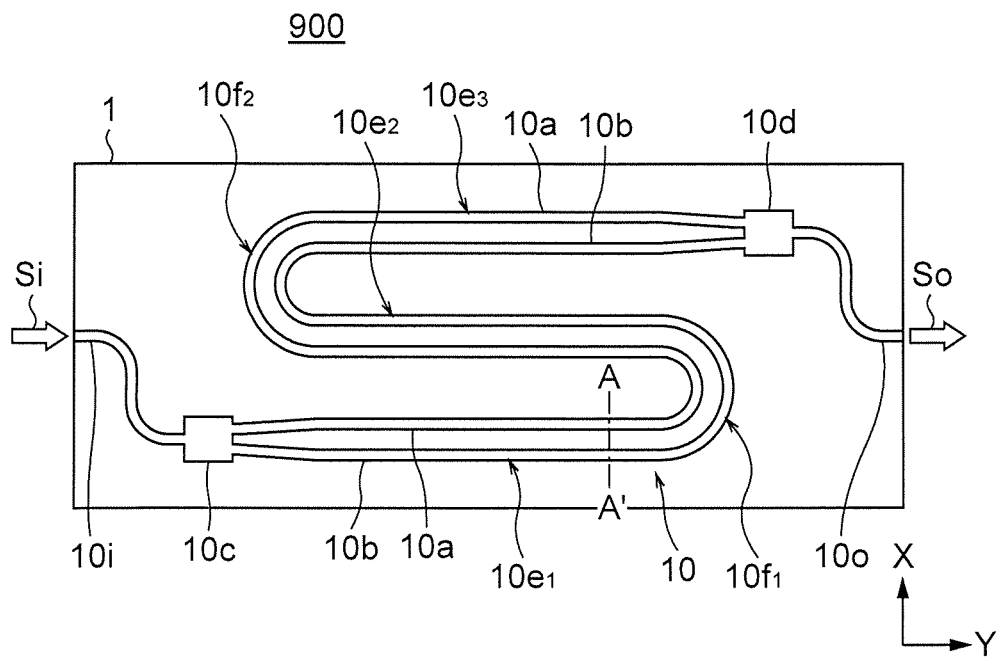
Figure 10B:
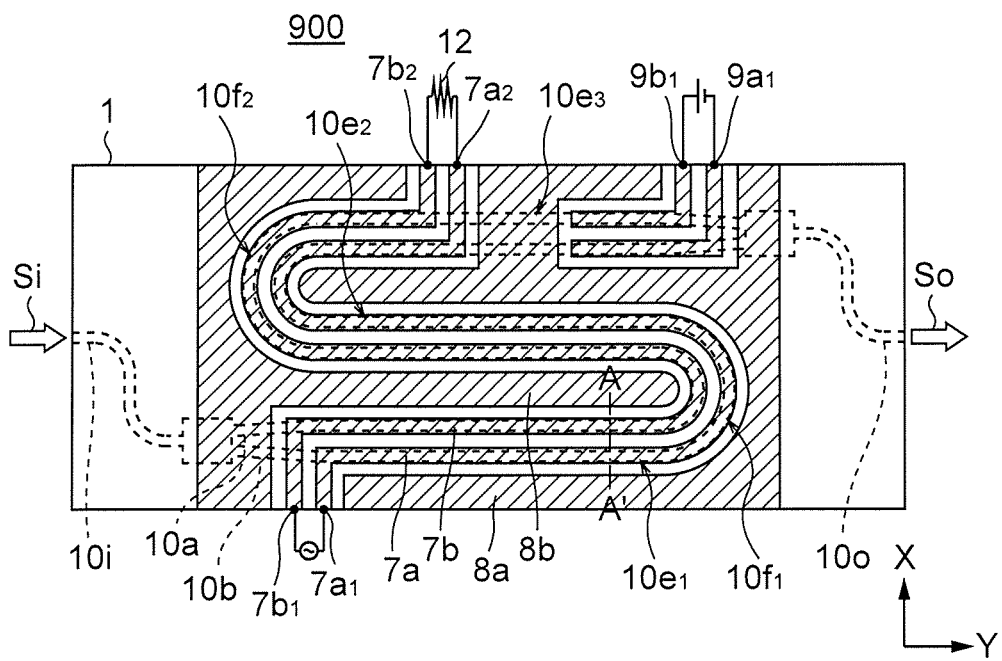
Figure 11A:
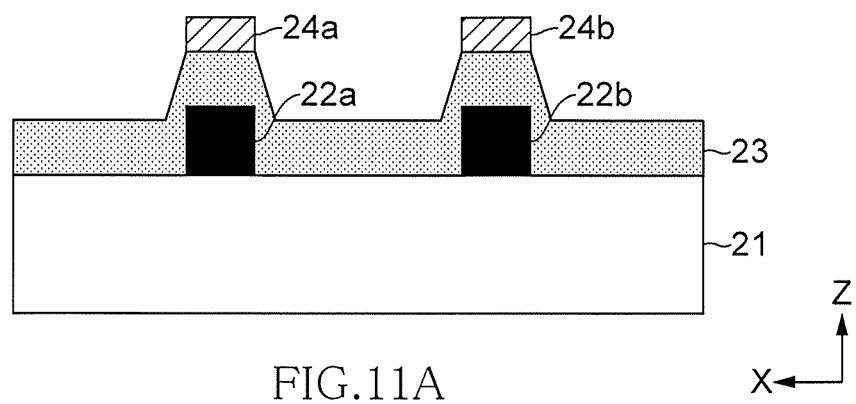
FIGS. 11A and 11B are schematic cross-sectional views each illustrating the structure of a conventional optical modulator.
Figure 11B:
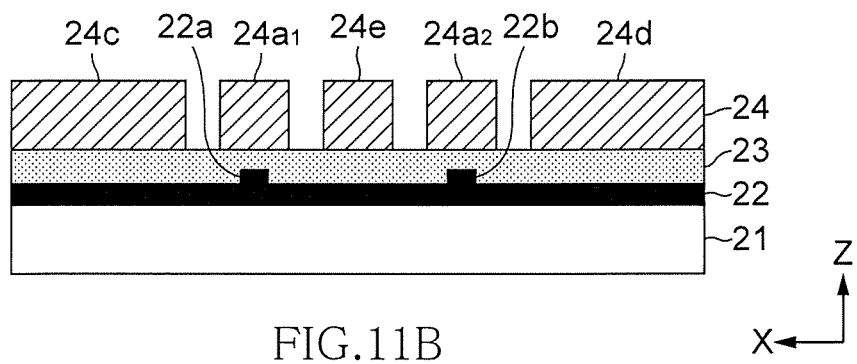

FIGS. 10A and 10B are schematic plan views illustrating the configuration of an optical modulator according to a ninth embodiment of the present invention. FIG. 10A illustrates only an optical waveguide, and FIG. 10B illustrates the entire configuration of the optical modulator including traveling-wave electrodes.

As illustrated in FIGS. 10A and 10B, an optical modulator 900 according to the present embodiment is featured in that the Mach-Zehnder optical waveguide 10 is constructed by a combination of a linear section and a curved section. Specifically, the Mach-Zehnder optical waveguide 10 has first to third linear sections $10e_1$, $10e_2$ and $10e_3$ arranged parallel to one another, a first curved section $10f_1$ connecting the first and second linear sections $10e_1$ and $10e_2$, and a second curved section $10f_2$ connecting the second and third linear sections $10e_2$ and $10e_3$. The first and second curved sections $10f_1$ and $10f_2$ are formed into concentric half circles so as to turn the traveling direction of the optical waveguide by 180°.

In the optical modulator 900 according to the present embodiment, the cross-sectional structures of the linear and curved sections of the Mach-Zehnder optical waveguide 10 taken along the line A-A' in FIGS. 10A and 10B are each formed into those illustrated in FIGS. 2 to 9. That is, the lower surface of the first signal electrode 7a covers the first optical waveguide 10a at the first linear section $10e_1$, first curved section $10f_1$, second linear section $10e_2$, second curved section $10f_2$ and third linear section $10e_3$ through the buffer layer 4, and the lower surface of the second signal electrode 7b covers the second optical waveguide 10b at the first linear section $10e_1$, first curved section $10f_1$, second linear section $10e_2$, second curved section $10f_2$ and third linear section $10e_3$ through the buffer layer 4. Although the first and second bias electrodes 9a and 9b are not particularly limited in position, they cover the first and second optical waveguides 10a and 10b at the other part of the third linear section $10e_3$. Although, in the present embodiment, the first and second signal electrodes 7a and 7b each entirely cover the first and second linear sections $10e_1$ and $10e_2$ and a part of the third linear section $10e_3$, they may each cover only, e.g., the first linear section $10e_1$.

In the present embodiment, the light Si is input to one end of the first linear section $10e_1$, travels from the one end of the first linear section $10e_1$ toward the other end thereof, makes a U-turn at the first curved section $10f_1$, travels from one end of the second linear section $10e_2$ toward the other end thereof in the direction opposite to the first linear section $10e_1$, makes a U-turn at the second curved section $10f_2$, and travels from one end of the third linear section $10e_3$ toward the other end thereof in the same direction as the first linear section $10e_1$.

The optical modulator has a problem of a long element length in practical applications. However, by folding the optical waveguide as illustrated, the element length can be significantly reduced, obtaining a remarkable effect for miniaturization. Particularly, the optical waveguide formed of the lithium niobate film is featured in that it has small loss even when the curvature radius of the curved section is reduced up to about 50 µm and is thus suitable for the present embodiment. Further, by providing the signal electrode not only in the linear section of the optical waveguide but also in the curved section, the electrode length can be increased to achieve low voltage operation. Further, by providing the dielectric film 6, it is possible to alleviate a problem of high frequency loss due to the provision of the signal electrode in the curved section.

While the preferred embodiments of the present invention have been described, the present invention is not limited to the above embodiments, and various modifications may be made within the scope of the present invention, and all such modifications are included in the present invention.

For example, in the above embodiments, the optical modulator has the pair of optical waveguides 10a and 10b each formed of the lithium niobate film epitaxially grown on the substrate 1; however, the present invention is not limited to such a structure, but the optical waveguides may be formed of an electro-optic material such as barium titanate or lead zirconium titanate. Further, as the waveguide layer 2, a semiconductor material, a polymer material or the like having electro-optic effect may be used.

What is claimed is:

1. An optical modulator comprising:
   a ridge-shaped optical waveguide formed of a dielectric thin film having electro-optic effect;
   a buffer layer covering the optical waveguide;
   a signal electrode formed on the buffer layer so as to be opposed to the optical waveguide through the buffer layer;
   a ground electrode formed on the buffer layer together with the signal electrode; and
   a dielectric film having a dielectric constant higher than air and covering at least a part of exposed surfaces of the signal electrode and ground electrode and exposed surfaces of the buffer layer, wherein
   at least a part of the dielectric film in an inter-electrode area between the signal electrode and the ground electrode is removed together with the buffer layer.

2. The optical modulator as claimed in claim 1, wherein the dielectric constant of the dielectric film is higher than the dielectric constant of the buffer layer.

3. An optical modulator comprising:
a ridge-shaped optical waveguide formed of a dielectric thin film having electro-optic effect;
a buffer layer covering the optical waveguide;
a signal electrode formed on the buffer layer so as to be opposed to the optical waveguide through the buffer layer;
a ground electrode formed on the buffer layer together with the signal electrode; and
a dielectric film having a dielectric constant higher than air and covering at least a part of exposed surfaces of the signal electrode and ground electrode and exposed surfaces of the buffer layer, wherein
the dielectric film is formed on an upper surface of the buffer layer, and the signal electrode and the ground electrode are formed on an upper surface of the dielectric film.

4. The optical modulator as claimed in claim 3, wherein the dielectric constant of the dielectric film is higher than the dielectric constant of the buffer layer.

5. An optical modulator comprising:
a ridge-shaped optical waveguide formed of a dielectric thin film having electro-optic effect;
a buffer layer covering the optical waveguide;
a signal electrode formed on the buffer layer so as to be opposed to the optical waveguide through the buffer layer;
a ground electrode formed on the buffer layer together with the signal electrode; and
a dielectric film having a dielectric constant higher than air and covering at least a part of exposed surfaces of the signal electrode and ground electrode and exposed surfaces of the buffer layer, wherein
the optical waveguide includes first and second waveguides constituting a Mach-Zehnder interferometer,
the signal electrode includes a first signal electrode opposed to the first waveguide through the buffer layer and a second signal electrode opposed to the second waveguide through the buffer layer,
the ground electrode includes a first ground electrode provided in the vicinity of the first signal electrode on a side opposite to the second signal electrode with respect to the first signal electrode and a second ground electrode provided in the vicinity of the second signal electrode on a side opposite to the first signal electrode with respect to the second signal electrode,
upper and both side surfaces of each of the first and second signal electrodes and upper and side surfaces of each of the first and second ground electrodes are not covered with the dielectric film, and
an upper surface of the buffer layer in a first inter-electrode area between the first and second signal electrodes is covered with the dielectric film.

6. The optical modulator as claimed in claim 5, wherein the upper surface of the buffer layer in a second inter-electrode area between the first signal electrode and the first ground electrode and a third inter-electrode area between the second signal electrode and the second ground electrode is covered with the dielectric film.

7. The optical modulator as claimed in claim 5, wherein the dielectric constant of the dielectric film is higher than the dielectric constant of the buffer layer.

8. The optical modulator as claimed in claim 5, wherein an upper surface of the buffer layer in a second inter-electrode area between the first signal electrode and the first ground electrode and a third inter-electrode area between the second signal electrode and the second ground electrode is not covered with the dielectric film.

9. An optical modulator comprising:
a ridge-shaped optical waveguide formed of a dielectric thin film having electro-optic effect;
a buffer layer covering the optical waveguide;
a signal electrode formed on the buffer layer so as to be opposed to the optical waveguide through the buffer layer;
a ground electrode formed on the buffer layer together with the signal electrode; and
a dielectric film having a dielectric constant higher than air and covering at least a part of exposed surfaces of the signal electrode and ground electrode and exposed surfaces of the buffer layer, wherein
the optical waveguide includes first and second waveguides constituting a Mach-Zehnder interferometer,
the signal electrode includes a first signal electrode opposed to the first waveguide through the buffer layer and a second signal electrode opposed to the second waveguide through the buffer layer,
the ground electrode includes a first ground electrode provided in the vicinity of the first signal electrode on a side opposite to the second signal electrode with respect to the first signal electrode and a second ground electrode provided in the vicinity of the second signal electrode on a side opposite to the first signal electrode with respect to the second signal electrode,
an upper surface of the buffer layer in a first inter-electrode area between the first and second signal electrodes is not covered with the dielectric film, and
upper and outer side surfaces of each of the first and second signal electrodes, upper and side surfaces of each of the first and second ground electrodes and an upper surface of the buffer layer in a second inter-electrode area between the first signal electrode and the first ground electrode and a third inter-electrode area between the second signal electrode and the second ground electrode are covered with the dielectric film.

10. The optical modulator as claimed in claim 9, wherein inner side surfaces of each of the first and second signal electrodes are not covered with the dielectric film.

11. The optical modulator as claimed in claim 9, wherein inner side surfaces of each of the first and second signal electrodes are covered with the dielectric film.

12. The optical modulator as claimed in claim 9, wherein the dielectric constant of the dielectric film is higher than the dielectric constant of the buffer layer.

13. An optical modulator comprising:
a ridge-shaped optical waveguide formed of a dielectric thin film having electro-optic effect;
a buffer layer covering the optical waveguide;
a signal electrode formed on the buffer layer so as to be opposed to the optical waveguide through the buffer layer;
a ground electrode formed on the buffer layer together with the signal electrode; and
a dielectric film having a dielectric constant higher than air and covering at least a part of exposed surfaces of the signal electrode and ground electrode and exposed surfaces of the buffer layer, wherein
the optical waveguide includes first and second waveguides constituting a Mach-Zehnder interferometer, the signal electrode includes a first signal electrode opposed to the first waveguide through the buffer layer and a second signal electrode opposed to the second waveguide through the buffer layer, the ground electrode includes a first ground electrode provided in the vicinity of the first signal electrode on a side opposite to the second signal electrode with respect to the first signal electrode and a second ground electrode provided in the vicinity of the second signal electrode on a side opposite to the first signal electrode with respect to the second signal electrode, an upper surface of each of the first and second signal electrodes, an upper surface of each of the first and second ground electrodes, and an upper surface of the buffer layer in a second inter-electrode area between the first signal electrode and the first ground electrode and a third inter-electrode area between the second signal electrode and the second ground electrode are not covered with the dielectric film, and both side surfaces of each of the first and second signal electrodes, the side surface of each of the first and second ground electrodes and an upper surface of the buffer layer in a first inter-electrode area between the first and second signal electrodes are covered with the dielectric film.

14. The optical modulator as claimed in claim 13, wherein the dielectric constant of the dielectric film is higher than the dielectric constant of the buffer layer.

* * * * *